(12) United States Patent
Bremner

(10) Patent No.: US 7,576,465 B2
(45) Date of Patent: Aug. 18, 2009

(54) DUAL ROTOR ELECTROMAGNETIC MACHINE

(75) Inventor: Ronald Dean Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 273 days.

(21) Appl. No.: 11/588,546

(22) Filed: Oct. 26, 2006

(65) Prior Publication Data
US 2008/0100168 A1  May 1, 2008

(51) Int. Cl.
H02K 19/00 (2006.01)
(52) U.S. Cl. .................... 310/162; 310/114; 310/52
(58) Field of Classification Search .............. 310/52, 310/58, 103, 112–121, 162, 254, 261
See application file for complete search history.

(56) References Cited

U.S. PATENT DOCUMENTS

| 4,654,577 A * | 3/1987 | Howard ............. 322/28 |
| 4,739,201 A | 4/1988 | Brigham et al. |
| 4,785,213 A * | 11/1988 | Satake .................... 310/116 |
| 4,817,461 A * | 4/1989 | Iseman .................... 74/720 |
| 4,885,493 A * | 12/1989 | Gokhale .................... 310/190 |
| 5,281,879 A * | 1/1994 | Satake et al. ............. 310/114 |
| 5,677,605 A | 10/1997 | Cambier et al. |
| 5,753,989 A * | 5/1998 | Syverson et al. ........... 310/114 |
| 6,380,640 B1 * | 4/2002 | Kanamori et al. ......... 290/40 C |
| 6,563,246 B1 * | 5/2003 | Kajiura et al. ............. 310/162 |
| 6,975,055 B2 | 12/2005 | Joong et al. |
| 6,998,757 B2 | 2/2006 | Seguchi et al. |

* cited by examiner

Primary Examiner—Thanh Lam

(57) ABSTRACT

The invention relates to an electric synchronous machine. There is a need for a dual rotor electric synchronous machine which has a mechanism for adjusting the rotor relative angular displacement while the machine is running in order to reduce back emf. There is a need for such an adjusting mechanism which can carry high torque loads. An electric synchronous machine is provided with a housing, first and second shafts rotatably supported in the housing, each with a corresponding rotor fixed thereon, both having permanent magnet field poles. Each rotor is surrounded by a corresponding annular stator, and stator coils are wound through both stators. A planetary transmission is coupled between the first and second shafts and operable during rotation of the first and second shafts to adjust an angular orientation of the second shaft with respect to the first shaft.

9 Claims, 6 Drawing Sheets

DUAL ROTOR ELECTROMAGNETIC MACHINE

BACKGROUND

The present invention relates to brushless permanent magnet motors and generators, especially those which must operate over a wide speed range, such as those used in hybrid vehicles or machine tools.

Brushless permanent magnet motors have a back-emf that is proportional to their speed. At high speeds, the back-emf of the motor can be much higher than the power supply can deliver. Above this speed, additional current out of phase with the back-emf must be added in order to weaken the magnetic field of the motor. This is known as "field weakening", and is described in U.S. Pat. No. 5,677,605 assigned to Unique Mobility, Inc. This current creates electrical power losses and heat, and requires the electronics to have an increased current capacity.

One attempt to solve this problem is described in U.S. Pat. No. 6,998,757 wherein a multi-rotor synchronous machine includes first and second rotors disposed on the outer and inner periphery of a stator core. A mechanism installed inside the second rotor controls relative rotation of the first and second rotors. An electromagnetic machine with two rotors is described in U.S. Pat. No. 4,739,201. The rotors are angularly displaced relative to each other in order to reduce torque ripple, but no mechanism is described for controlling or varying the relative angular displacement between the rotors. Another electromagnetic machine with two rotors is described in U.S. Pat. No. 6,975,055, where the two rotors with field magnets are screwed onto a threaded rod.

However, none of these machines appears to have a mechanism for adjusting the rotor relative angular displacement which is simple, inexpensive, capable of operating while the machine is running and which can carry high torque loads.

SUMMARY

Accordingly, an object of this invention is to provide a dual rotor electromagnetic machine with a mechanism for adjusting the rotor relative angular displacement which is simple and inexpensive.

Another object of this invention is to provide a dual rotor electromagnetic machine with such a mechanism which is capable of operating while the machine is running.

Another object of this invention is to provide a dual rotor electromagnetic machine with such a mechanism which can carry high torque loads.

These and other objects are achieved by the present invention, wherein an electric synchronous machine includes a housing and a pair of shafts rotatably supported in the housing. A first rotor is fixed for rotation with the first shaft and a second rotor is fixed for rotation with the second shaft. Both rotors carry permanent magnet field poles. A first annular stator is mounted in the housing and surrounds the first rotor. A second annular stator is mounted in the housing and surrounds the second rotor. Both stators have stator coils wound thereon. A gap separates the first and second stators. A coupling mechanism is coupled to the first and second shafts and is operable during rotation of the first and second shafts to adjust an angular orientation of the second shaft with respect to the first shaft.

The coupling mechanism is a planetary transmission with a first sun gear coupled to the first shaft, a second sun gear coupled to the second shaft, a first planet gear set coupled to the first sun gear, a second planet gear set coupled to the second sun gear, a planet carrier rotatably supporting the first and second planet gear sets, a fixed ring gear fixed to the housing and meshingly engaging the first planetary gear set, and a movable ring gear rotatably supported by the housing and meshingly engaging the second planetary gear set.

DETAILED DESCRIPTION

Figure 1:
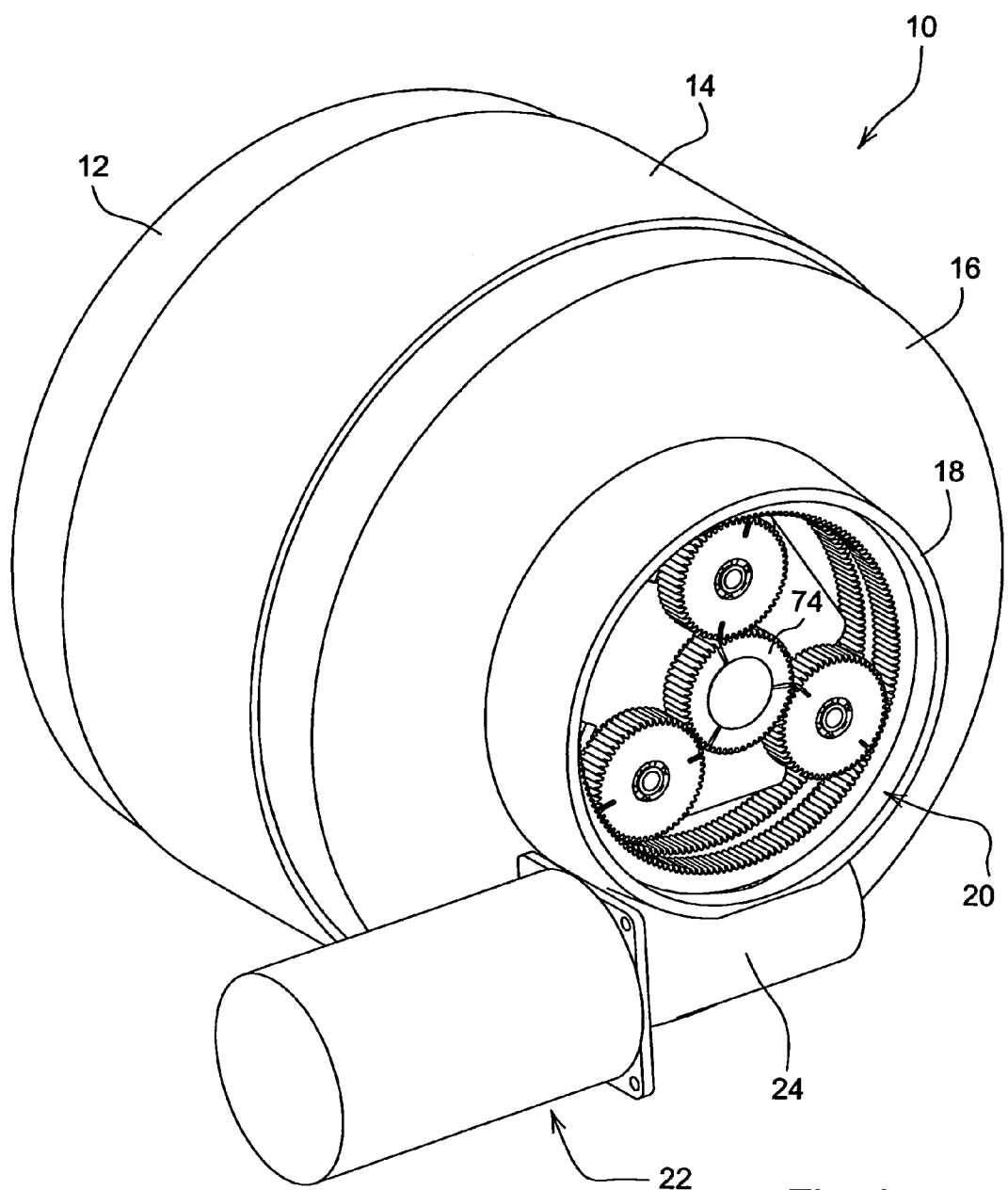
FIG. 1 is a perspective view of a electromagnetic machine embodying the present invention with an end plate removed.

Referring to FIG. 1, a multi-rotor synchronous electromagnetic machine 10 has a housing 11 which includes a first end housing 12, a center housing 14 and a second end housing 16. A cylindrical housing ring 18 projects from an end of the housing 16 and surrounds a planetary gear mechanism 20. An actuator 22 with a worm gear 24 is attached to the housing ring 18.

Figure 2:
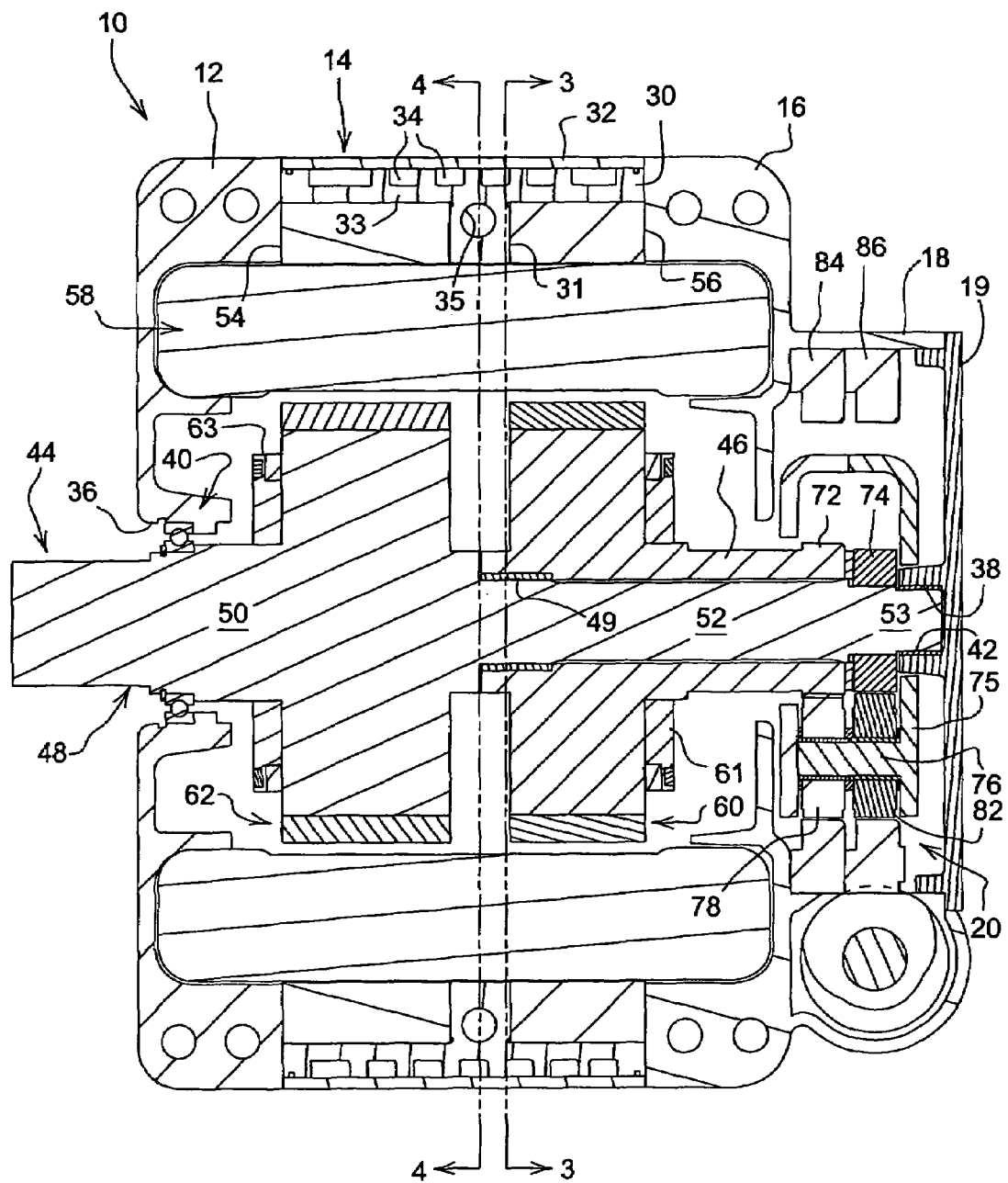
FIG. 2 is a sectional view of the electromagnetic machine of FIG. 1.

Referring now to FIG. 2, the center housing 14 has an inner sleeve 30 and an outer sleeve 32. An end plate 19 covers the housing ring 18. A plurality of water cooling channels 34 are formed in the outer peripheral surface of inner sleeve 30, and these channels 34 are covered and sealed by the outer sleeve 32. Sleeve 30 preferably has a T-shaped cross sectional shape and is formed of a heat conducting material, such as aluminum. Sleeve 30 has an annular central leg 31 which projects radially inwardly from an inner surface of cylindrical rim 33. End housing 12 has a central opening 36. End plate 19 forms a central blind bore 38. Bearing 40 is mounted in the opening 36 and a bearing 42 is mounted in the bore 38 and thereby rotatably support a two-part shaft assembly 44.

Shaft assembly 44 includes a first hollow outer shaft 46 and a second solid inner shaft 48. Second shaft 48 includes a larger diameter portion 50 and a smaller diameter portion 52 which rotatably receives first shaft 46. The larger diameter portion 50 of shaft 48 is rotatably supported by bearing 40, and an end 53 of portion 52 is rotatably supported by bearing 42. Larger diameter portion 50 extends through first shaft 46 to end 53 which projects outwardly of an axial end of first shaft 46. A bearing sleeve 49 rotatably supports an inner end of hollow shaft 46 adjacent to a shoulder which joins the larger and smaller diameter portions of shaft 48.

Hollow annular stators 54 and 56 are non-rotatably mounted inside the housing 11 concentric with the shaft assembly 44 and are preferably made of steel. A conventional hollow annular coil assembly 58 is non-rotatably mounted inside the stators 54 and 56, and is also concentric with the shaft assembly 44.

A first rotor 60 is integral to or mounted on and fixed for rotation with the first shaft 46. A second rotor 62 is integral with or mounted on and fixed for rotation with the larger diameter portion 50 of second shaft 48, and is spaced axially apart from first rotor 60. An air gap separates stator assemblies 54 and 56 from the rotors 60 and 62.

An annular magnetic sensing ring 61 is mounted on shaft 46 next to an outer end surface of rotor 60. An annular magnetic sensing ring 63 is mounted on shaft 50 next to an outer end surface of rotor 62. The magnetic sensing rings 61 and 63 are conventional sensing rings and may be used to provide signals indicating the position of the shafts they are mounted on. The motor preferably has 3-phase windings. A controller (not shown) delivers current to the windings based upon the sensed position of the shafts.

Figure 5:
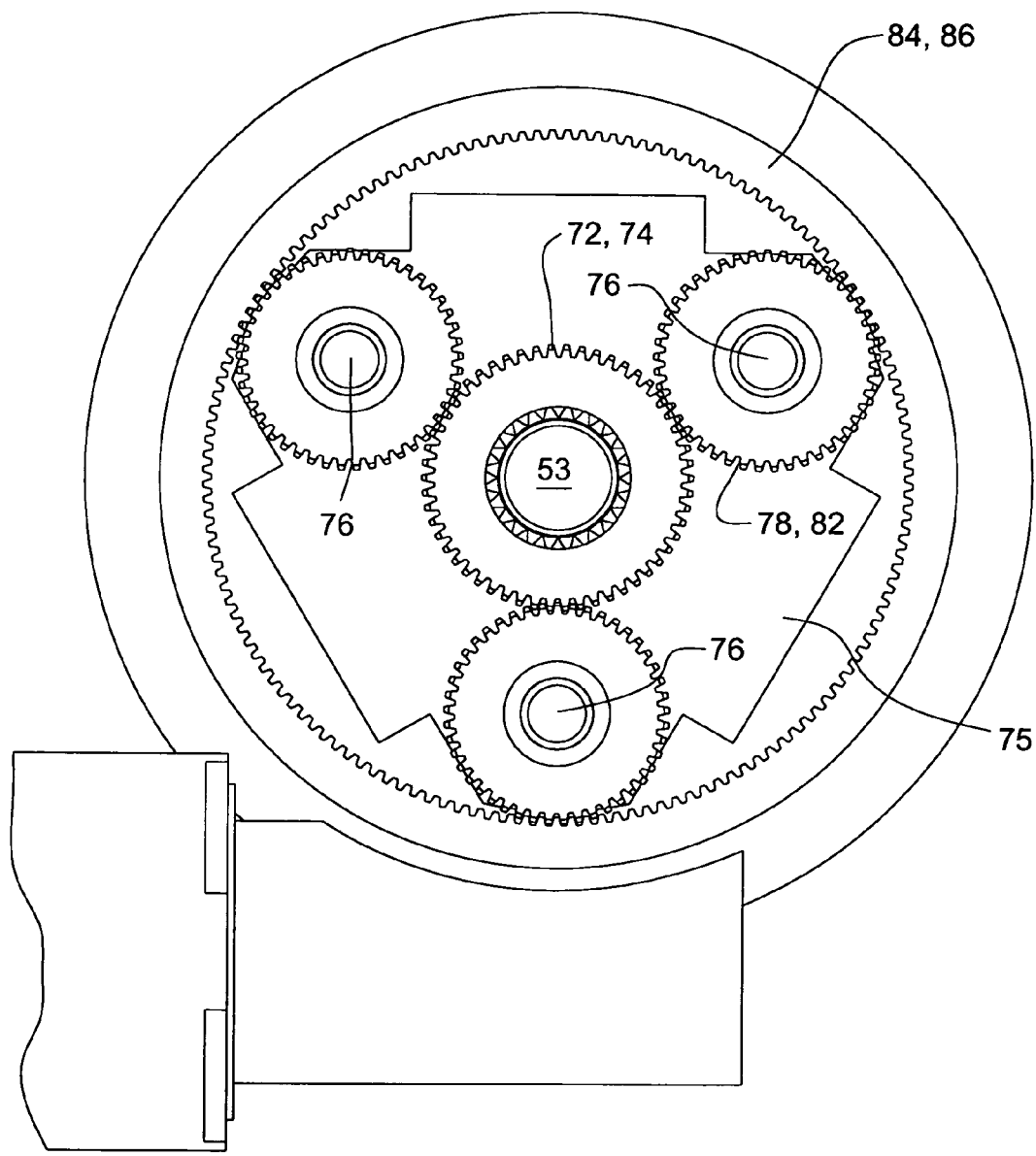
FIG. 5 is an end view of the electromagnetic machine of FIG. 1.

Referring now to FIGS. 2 and 5, a planetary transmission 20 is surrounded by housing ring 18. The planetary transmission 20 includes a first sun gear 72 formed on the outer end of first shaft 46, and a second sun gear 74 mounted on and fixed for rotation by splines (not shown) with the end 53 of the inner shaft 48. Sun gears 72 and 74 preferably have the same outer diameter. A rotatable planet carrier 75 includes a plurality of planet carrier posts 76. A first set of planet gears 78 are rotatably mounted on the posts 76 for meshing engagement with the teeth of first sun gear 72. A second set of planet gears 82 are rotatably mounted adjacent to planet gears 78 on the posts 76 for meshing engagement with sun gear 74. A fixed ring gear 84 is fixed to an inner surface of ring housing 18 and meshingly engages the first planetary gears 78. A movable ring gear 86 is rotatably mounted in the ring housing 18 adjacent to fixed ring gear 84. Ring gear 86 meshingly engages the second planetary gears 82. The worm gear 24 of actuator 22 meshingly engages teeth formed on the outer surface of ring gear 86.

Figure 3:
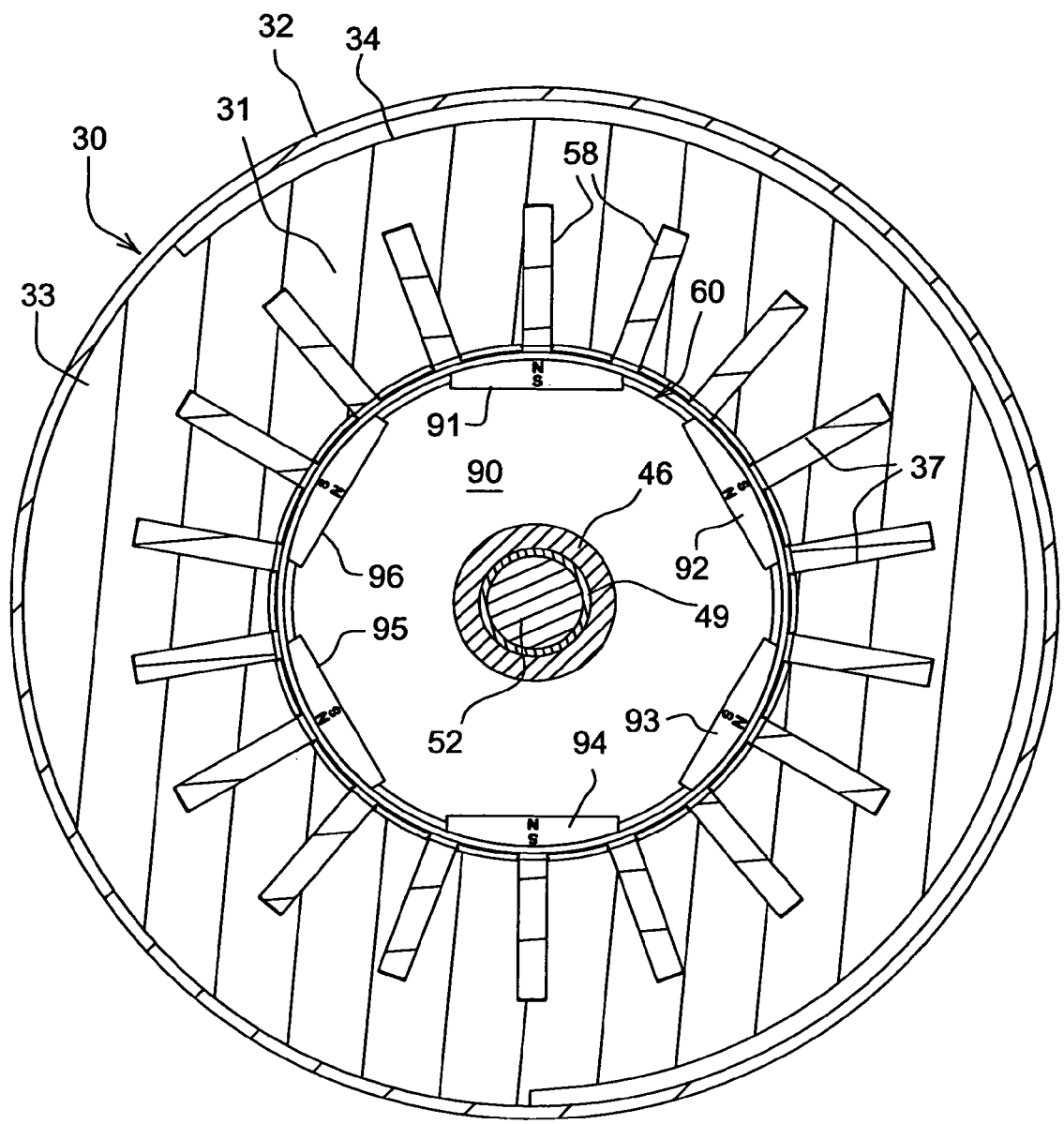
FIG. 3 is a view taken along lines 3-3 of FIG. 2.

As best seen in FIG. 3, the first rotor 60 includes an annular rotor member 90 and a plurality of permanent magnets 91-96 mounted on the periphery thereof. Magnets 91, 93 and 95 have their north magnetic poles oriented radially outwardly. Magnets 92, 94 and 96 are positioned between respective pairs of the magnets 91, 93 and 95, and have their south magnetic poles oriented radially outwardly. As a result, as one progresses around the periphery of rotor 60, each magnet has a magnetic pole orientation which is opposite to or shifted 180 degrees with respect to that of the adjacent magnet.

Figure 4:
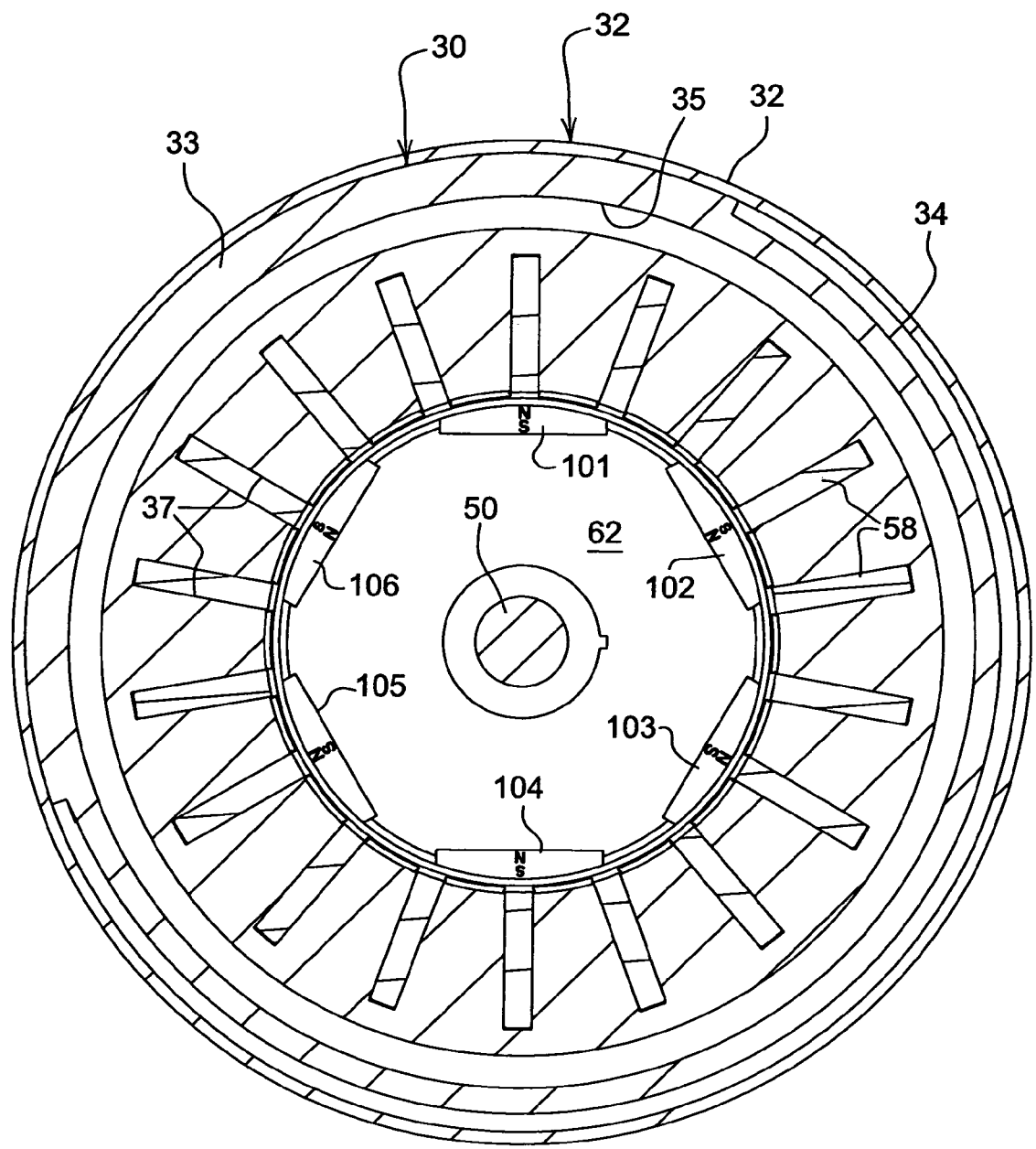
FIG. 4 is a view taken along lines 4-4 of FIG. 2.

As best seen in FIG. 4, the second rotor 62 includes an annular rotor member 100 and a plurality of permanent magnets 101-106 mounted on the periphery thereof. Magnets 101, 103 and 105 have their north magnetic poles oriented radially outwardly. Magnets 102, 104 and 106 are positioned between respective pairs of the magnets 101, 103 and 105, and have their south magnetic poles oriented radially outwardly. As a result, as one progresses around the periphery of second rotor 62, each magnet has a magnetic pole orientation which is opposite to or shifted 180 degrees with respect to that of the adjacent magnet. The magnets 91-96 and 101-106 preferably have the same angular width. They may also have the same axial length.

As best seen in FIG. 2, stators 54 and 56 are axially spaced apart, and the gap or space between them is filled by leg 31 of sleeve 30, and a coolant channel 35 is formed in leg 31 to conduct heat away therefrom. As best seen in FIGS. 3 and 4, the leg 31 of the sleeve 30 extends radially inwardly and includes a plurality of slots 37, each of which receives a corresponding one of the coils 58. As a result, the leg 31 surrounds all but the inner end of each coil 58, so as to effectively conduct heat away from the coils 58.

Figure 6:
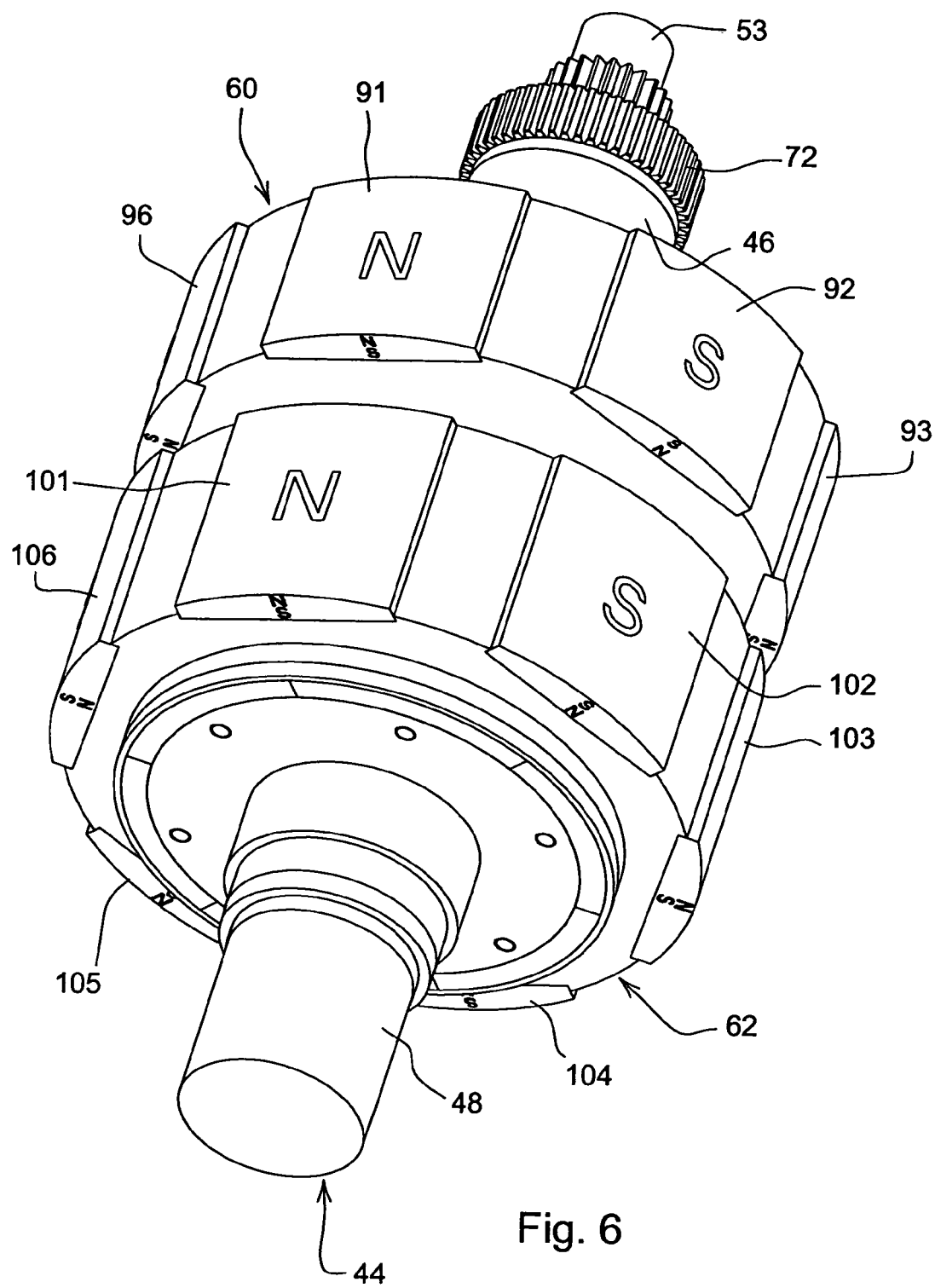
FIG. 6 is a perspective view of the rotor assembly of FIG. 1.

The rotors 60 and 62 rotate at the motor speed. As shown in FIG. 6, below a base speed, rotors 60 and 62 are oriented with respect to each other so that the north and south poles of their respective magnets 91-96 and 101-106 have the same alignment in the radial direction. This causes the voltages in each coil section 58 to create maximum back-emf. Above a base motor speed, the rotors 60 and 62 are intentionally misaligned with respect to each other, by rotating ring gear 86. For example, rotating ring gear 86 counter-clockwise viewing FIG. 1 will rotate sun gear 74, shaft 48 and second rotor 62 clockwise with respect to first rotor 60. With the planetary transmission 20 the alignment of the rotors 60 and 62 can be varied and controlled while the motor 10 is operating, and the planetary transmission 20 will withstand operation at high power and torque levels.

Preferably, one of the rotors 60 and 62, and the magnets mounted thereon will be longer in the axial direction than the other rotor and its magnets. For example, in FIG. 2 rotor 62 is axially longer than rotor 60 in a ratio of 55% to 45%. As a result, at a base speed with the rotors 60 and 62 aligned as shown in FIG. 6, the combined emf will be a maximum (100%). The misalignment of rotors 60 and 62 reduces the sum of the back-emfs. Thus, at this same speed, if the rotors are fully misaligned, the combined back-emf will be 10% of the maximum (55%-45%). At ten times the base speed, if the rotors are fully misaligned, the combined back-emf will be 100% of the maximum at the base speed (10×(55−45)).

Alternatively, if the magnets on each rotor have the same size and shape, and have the same magnetic properties, the rotors can be fully misaligned (by 60 degrees for rotors carrying 6 magnets), or so that a north pole on rotor 60 is aligned with a south pole on rotor 62, and no back-emf will be generated. Thus, the motor 10 can be configured to produce no back emf voltage during overspeed operation, and thereby protect against voltage overloads and shorting of the coils 58.

While the present invention has been described in conjunction with a specific embodiment, it is understood that many alternatives, modifications and variations will be apparent to those skilled in the art in light of the foregoing description. For example, the rotors and magnets can have different sizes, shapes and materials, or the rotors can carry fewer or more magnets. Accordingly, this invention is intended to embrace all such alternatives, modifications and variations which fall within the spirit and scope of the appended claims.

I claim:

1. An electric synchronous machine comprising:
   a housing;
   a first shaft rotatably supported in the housing;
   a second shaft rotatably supported in the housing;
   a coupling mechanism coupled to the first and second shafts and operable during rotation of the first and second shafts to adjust an angular orientation of the second shaft with respect to the first shaft;
   a first rotor, having a first length, fixed for rotation with the first shaft;
   a second rotor, having a second length different from the first length, fixed for rotation with the second shaft, the first and second rotors both having permanent magnet field poles;
   a first annular stator mounted in the housing and surrounding the first rotor; and
   a second annular stator mounted in the housing and surrounding the second rotors, the first and second stator having stator coils wound thereon.

2. The synchronous machine of claim 1, wherein:
   the coupling mechanism comprises a planetary transmission.

3. The synchronous machine of claim 2, wherein:
   the planetary transmission comprises a first sun gear coupled to the first shaft, a second sun gear coupled to the second shaft, a first planet gear set coupled to the first sun gear, a second planet gear set coupled to the second sun gear, a planet carrier rotatably supporting the first and second planet gear sets, a fixed ring gear fixed to the housing and meshingly engaging the first planetary gear set, and a movable ring gear rotatably supported by the housing and meshingly engaging the second planetary gear set.

4. The synchronous machine of claim 1, wherein:
the first shaft comprises a hollow sleeve rotatably mounted on a portion of the second shaft.

5. The synchronous machine of claim 3, wherein:
the first shaft comprises a hollow sleeve rotatably mounted on a portion of the second shaft.

6. The synchronous machine of claim 5, wherein:
the second shaft comprises a first part upon which is mounted the second rotor and a second part which extends through the first shaft, the second part having an end which is fixed to the second sun gear.

7. An electric synchronous machine comprising:
a housing;
a thermally conducting member;
a first shaft rotatably supported in the housing;
a second shaft rotatably supported in the housing;
a coupling mechanism coupled to the first and second shafts and operable during rotation of the first and second shafts to adjust an angular orientation of the second shaft with respect to the first shaft;
a first rotor, having a first length, fixed for rotation with the first shaft;
a second rotor, having a second length different from the first length, fixed for rotation with the second shaft, the first and second rotors both having permanent magnet field poles, the first and second stators being spaced axially apart from each other on opposite sides of the thermally conducting member;
a first annular stator mounted in the housing and surrounding the first rotor; and
a second annular stator mounted in the housing and surrounding the second rotors, the first and second stator having stator coils wound thereon.

8. The synchronous machine of claim 7, wherein:
a coolant channel is formed in the thermally conducting member.

9. An electric synchronous machine comprising:
a housing;
a first shaft rotatably supported in the housing;
a second shaft rotatably supported in the housing;
a coupling mechanism coupled to the first and second shafts and operable during rotation of the first and second shafts to adjust an angular orientation of the second shaft with respect to the first shaft;
a first rotor, having a first length, fixed for rotation with the first shaft;
a second rotor, having a second length different from the first length, fixed for rotation with the second shaft, the first and second rotors both having permanent magnet field poles, the housing comprises a thermally conducting member positioned axially between the first and second stators;
a first annular stator mounted in the housing and surrounding the first rotor; and
a second annular stator mounted in the housing and surrounding the second rotors, the first and second stator having stator coils wound thereon.

* * * * *